(12) United States Patent
Kwatra et al.

(10) Patent No.: US 11,423,583 B2
(45) Date of Patent: Aug. 23, 2022

(54) AUGMENTED REALITY ENABLED HANDLING AND RISK MITIGATION

(71) Applicant: INTERNATIONAL BUSINESS MACHINES CORPORATION, Armonk, NY (US)

(72) Inventors: Shikhar Kwatra, Raleigh, NC (US); Sarbajit K. Rakshit, Kolkata (IN); Adam Lee Griffin, Dubuque, IA (US); Spencer Thomas Reynolds, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 16/921,170

(22) Filed: Jul. 6, 2020

(65) Prior Publication Data

US 2022/0005234 A1 Jan. 6, 2022

(51) Int. Cl.
| | |
|---|---|
| *G06T 11/00* | (2006.01) |
| *G06F 16/245* | (2019.01) |
| *G06N 20/00* | (2019.01) |
| *G08B 5/22* | (2006.01) |
| *G08B 21/02* | (2006.01) |

(Continued)

(52) U.S. Cl.
CPC ............ *G06T 11/00* (2013.01); *G06F 16/245* (2019.01); *G06N 5/04* (2013.01); *G06N 20/00* (2019.01); *G08B 5/22* (2013.01); *G08B 21/02* (2013.01); *G06V 20/00* (2022.01)

(58) Field of Classification Search
CPC ......... G06T 11/00; G06F 16/245; G06N 5/04; G06N 20/00; G08B 5/22; G08B 21/02; G06V 20/00; G06V 10/94; G06V 20/20; G06K 9/6289
See application file for complete search history.

(56) References Cited

U.S. PATENT DOCUMENTS

| | | | |
|---|---|---|---|
| 7,212,113 B2 | 5/2007 | Zanovitch | |
| 8,572,013 B1 * | 10/2013 | Nash ...................... | G06F 16/35 706/20 |
| 9,299,013 B1 | 3/2016 | Curlander | |

(Continued)

FOREIGN PATENT DOCUMENTS

| | | |
|---|---|---|
| CN | 106843491 A | 6/2017 |
| CN | 108458790 A | 8/2018 |

(Continued)

OTHER PUBLICATIONS

International filing of PCT IB2021/055922, filed Jul. 1, 2021, entitled: "Augmented Reality Enabled Handling and Risk Mitigation", Application and Drawings, pp. 1-37.

(Continued)

*Primary Examiner* — Maurice L. McDowell, Jr.
(74) *Attorney, Agent, or Firm* — Kristofer L. Haggerty

(57) ABSTRACT

The exemplary embodiments disclose a method, a computer program product, and a computer system for mitigating the risks associated with handling items. The exemplary embodiments may include collecting data relating to one or more items, extracting one or more features from the collected data, determining one or more hazards based on the extracted one or more features and one or more models, and displaying the one or more hazards within an augmented reality device worn by a user.

17 Claims, 7 Drawing Sheets

(51) Int. Cl.
*G06N 5/04* (2006.01)
*G06V 20/00* (2022.01)

(56) References Cited

U.S. PATENT DOCUMENTS

| | | | |
|---|---|---|---|
| 9,477,888 | B1 | 10/2016 | Lewis |
| 9,846,999 | B1* | 12/2017 | Pickover ........... H04M 1/72403 |
| 9,892,353 | B1 | 2/2018 | Lui |
| 2014/0067729 | A1 | 3/2014 | Kozloski |
| 2017/0132460 | A1 | 5/2017 | Curlander |
| 2017/0344919 | A1* | 11/2017 | Chang ................... A61B 5/1118 |
| 2017/0372499 | A1 | 12/2017 | Lalonde |
| 2018/0017972 | A1 | 1/2018 | Chefalas |
| 2018/0129276 | A1 | 5/2018 | Nguyen |
| 2018/0181810 | A1 | 6/2018 | Jhawar |
| 2018/0197139 | A1 | 7/2018 | Hill |
| 2018/0267491 | A1* | 9/2018 | Gordon ..................... G05B 9/02 |
| 2019/0385297 | A1* | 12/2019 | Khosrowpour .... G06K 9/00476 |
| 2020/0117903 | A1* | 4/2020 | Goel ..................... G06K 9/6273 |
| 2020/0168069 | A1* | 5/2020 | Kanukurthy ......... A41D 13/002 |
| 2020/0265701 | A1* | 8/2020 | Schenker ............... G06V 20/20 |
| 2020/0297250 | A1* | 9/2020 | Elhawary ............. A61B 5/6823 |
| 2021/0097311 | A1* | 4/2021 | McBeth ................ H04W 4/029 |
| 2021/0109497 | A1* | 4/2021 | Man ..................... G05B 19/406 |
| 2021/0174952 | A1* | 6/2021 | Leong ..................... G06N 20/00 |
| 2021/0216773 | A1* | 7/2021 | Bohannon .............. G06V 20/20 |

FOREIGN PATENT DOCUMENTS

| | | |
|---|---|---|
| CN | 109508844 A | 3/2019 |
| WO | 2019126236 A1 | 6/2019 |
| WO | 2019212495 A1 | 11/2019 |

OTHER PUBLICATIONS

International Search Report, International application No. PCT/IB2021/055922, International filing date, Jul. 1, 2021, reference No. P201809236PCT01, dated Oct. 12, 2021, pp. 1-8.

Marketwatch, "Global Augmented and Virtual Reality Market Will Surpass USD 305 billion by 2026", https://www.marketwatch.com/press-release/global-augmented-and-virtua . . . , Feb. 12, 2020, pp. 1-3.

Mell et al., "The NIST Definition of Cloud Computing", National Institute of Standards and Technology, Special Publication 800-145, Sep. 2011, pp. 1-7.

* cited by examiner

AUGMENTED REALITY ENABLED HANDLING AND RISK MITIGATION

BACKGROUND

The exemplary embodiments relate generally to augmented reality, and more particularly to using augmented reality to mitigate the risks of handling items.

Many people may handle items in risky manners without being aware of the risks involved. When people are aware of the risks involved, it can be difficult for them to evaluate those risks and alter their approach of handling items in response to those risks. For example, a user may pick up a hot plate without knowing the plate is hot or drop an object they did not know was unstable.

SUMMARY

The exemplary embodiments disclose a method, a computer program product, and a computer system for mitigating the risks associated with handling items. The exemplary embodiments may include collecting data relating to one or more items, extracting one or more features from the collected data, determining one or more hazards based on the extracted one or more features and one or more models, and displaying the one or more hazards within an augmented reality device worn by a user.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
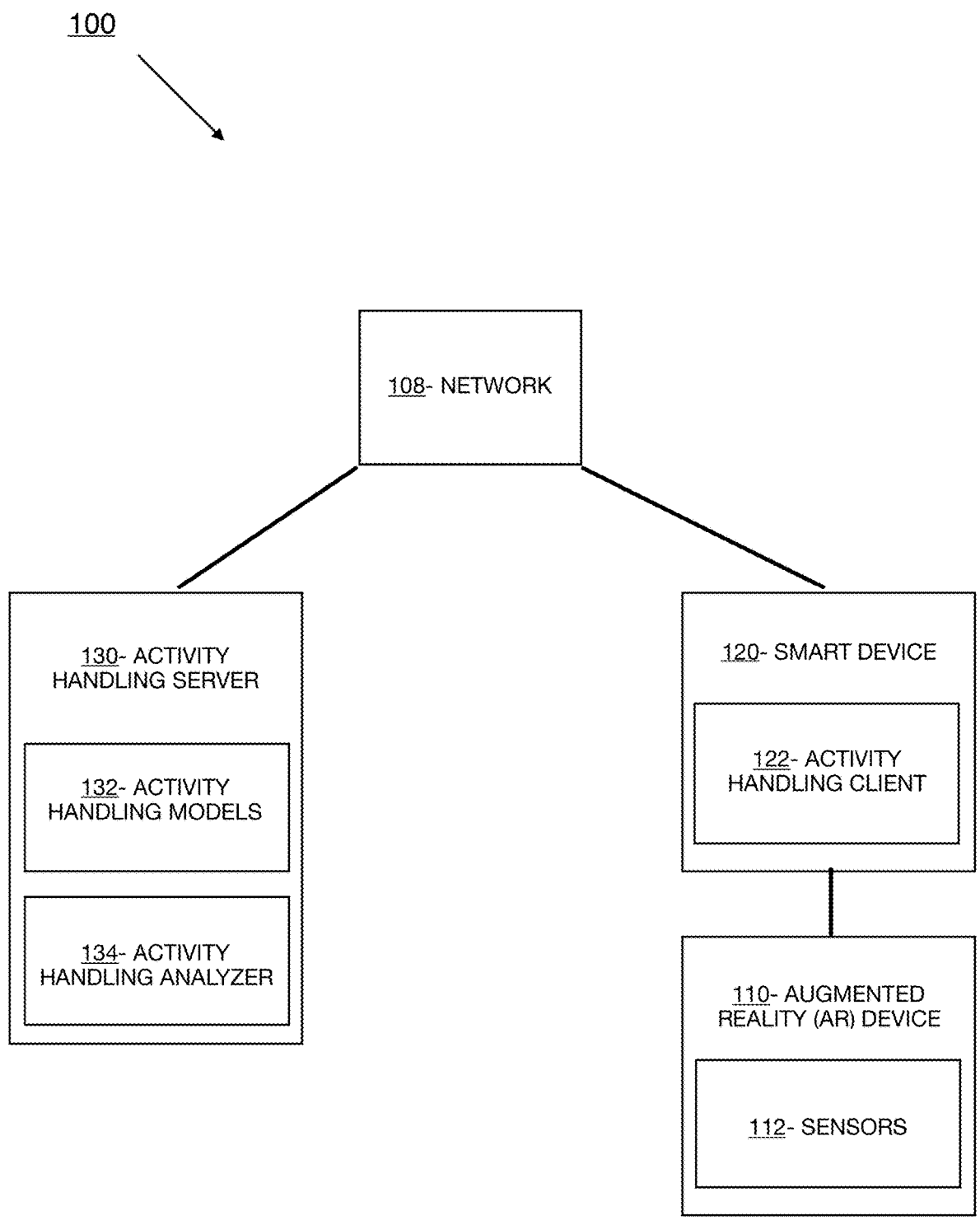
FIG. 1 depicts an exemplary schematic diagram of an activity handling system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

Many people may handle items in risky manners without being aware of the risks involved. When people are aware of the risks involved, it can be difficult for them to evaluate those risks and alter their approach of handling items in response to those risks. For example, a user may pick up a hot plate without knowing the plate is hot or drop an object they did not know was unstable.

Exemplary embodiments are directed to a method, computer program product, and computer system for mitigating the risks associated with handling items. In embodiments, machine learning may be used to create models capable of determining hazards and risks, while feedback loops may improve upon such models. Moreover, data from user uploads, databases, or the sensors 112 may be used to determine hazards and risks. The various data may relate to features of the object, for example composition, size, weight, center of mass, center of gravity, temperature, fragility, radiation, electrical charge, causticness, adhesiveness, movement history, usage, etc. In addition, data may relate to features of the environment, for example weather, location, surface, grade/slope, etc. The data may also relate to features of the user, for example user traits, biometrics, speech, tools (e.g., gloves, hand truck, dolly), etc. In general, it will be appreciated that embodiments described herein may relate to aiding in the mitigation of risks associated with handling any items within any environment and for any motivation.

Use cases of embodiments described herein may relate to the handling of hazardous objects, for example those that are heavy, unbalanced (e.g., top-heavy), fragile, hot/cold, radioactive, caustic, adhesive, etc. The exemplary embodiments may improve upon the existing art by utilizing augmented reality in order to both notify a user of the hazards associated with an object as well as a suggested means for addressing the hazards prior to handling. Moreover, the exemplary embodiments may further allow for detection of unknown hazards associated with the handling of objects. In general, it will be appreciated that embodiments described herein may relate to aiding a user in the mitigation of risks of handling any items within any environment. Detailed description of the exemplary embodiments follow.

FIG. 1 depicts the activity handling system 100, in accordance with the exemplary embodiments. According to the exemplary embodiments, the activity handling system 100 may include one or more augmented reality (AR) devices 110, a smart device 120, and an activity handling server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the activity handling system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the exemplary embodiments, the AR device 110 may be a wearable device capable of overlaying/superimposing computer-generated images upon a user view of a real-world scene. In embodiments, the AR device 110 may include one or more sensors 112, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the AR device 110 is shown as a single device, in other embodiments, the AR device 110 may be comprised of a cluster or plurality of computing devices, in a modular manner, etc., working together or working independently. The AR device 110 is described in greater detail as a hardware implementation with reference to FIG. 5, as part of a cloud implementation with reference to FIG. 6, and/or as utilizing functional abstraction layers for processing with reference to FIG. 7.

In example embodiments, the sensors 112 may comprise a camera, microphone, light sensor, infrared sensor, movement detection sensor, pressure detection sensor, thermometer, accelerometer, gyroscope, heart rate monitor, or other sensory hardware equipment. Moreover, the AR device 110 may incorporate an array of the one or more sensors 112 such that information can be obtained by the sensors 112 in multiple directions, at different times/intervals, in different mediums/frequencies, and the like. For example, the AR device 110 may be a pair of goggles that includes three forward-facing cameras that each record an adjacent sixty-degree viewing angle spanning a total of one-hundred and eighty degrees in front of a user. Moreover, data processing techniques may be implemented such that directional information of visual and audio data can be obtained based on signals received by each of the three sensors 112, such as trilateration and triangulation.

While the sensors 112 are depicted as integrated with the AR device 110, in embodiments, the sensors 112 may be incorporated within an environment in which the activity handling system 100 is implemented. For example, the sensors 112 may be one or more microphones built into an auditorium, a camera built into a facility, a spectrometer, infrared thermometer, pedometer, etc. Moreover, data processing techniques may be implemented such that directional information of visual and audio data can be obtained based on signals received by each of the sensors 112, such as trilateration and triangulation. In other embodiments, the sensors 112 may be integrated with other smart devices, e.g., smart phones and laptops, within an environment implementing the activity handling system 100. In such embodiments, the sensors 112 may communicate directly with other networks and devices, such as the network 108. The sensors 112 are described in greater detail as a hardware implementation with reference to FIG. 5, as part of a cloud implementation with reference to FIG. 6, and/or as utilizing functional abstraction layers for processing with reference to FIG. 7.

In the example embodiment, the smart device 120 includes an activity handling client 122, and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 5, as part of a cloud implementation with reference to FIG. 6, and/or as utilizing functional abstraction layers for processing with reference to FIG. 7.

The activity handling client 122 may act as a client in a client-server relationship. The activity handling client 122 may also be a software and/or hardware application capable of communicating with and providing a user interface for a user to interact with a server via the network 108. Moreover, in the example embodiment, the activity handling client 122 may be capable of transferring data from the AR device 110 and/or the sensors 112 between the smart device 120 and other devices via the network 108. In embodiments, the activity handling client 122 utilizes various wired and wireless connection protocols for data transmission and exchange, including Bluetooth, 2.4 gHz and 5 gHz internet, near-field communication, Z-Wave, Zigbee, etc. The activity handling client 122 is described in greater detail with respect to FIG. 2.

In the exemplary embodiments, the activity handling server 130 may include one or more activity handling models 132 and an activity handling analyzer 134, and may act as a server in a client-server relationship with the activity handling client 122. The activity handling server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the activity handling server 130 is shown as a single device, in other embodiments, the activity handling server 130 may be comprised of a cluster or plurality of computing devices, working together or working independently. The activity handling server 130 is described in greater detail as a hardware implementation with reference to FIG. 5, as part of a cloud implementation with reference to FIG. 6, and/or as utilizing functional abstraction layers for processing with reference to FIG. 7.

The activity handling models 132 may be one or more algorithms modelling a correlation between one or more features detected by the sensors 112 and one or more hazardous objects. In the example embodiment, the activity handling models 132 may be generated using machine learning methods, such as neural networks, deep learning, hierarchical learning, Gaussian Mixture modelling, Hidden Markov modelling, and K-Means, K-Medoids, or Fuzzy C-Means learning, etc., and may model a likelihood of one or more features being indicative of a hazard. In embodiments, such features may be related to the object, for example composition, size, weight, center of mass, center of gravity, temperature, fragility, radiation, electrical charge, causticness, adhesiveness, movement history, usage, etc. In addition, the features may relate to the environment, for example weather, location, surface, grade/slope, etc. The features may also relate to the user, for example user traits, biometrics, speech, tools (e.g., gloves, hand truck, dolly), etc. The activity handling models 132 may weight the features based on an effect that the features have on the hazards involved with the handling of an item.

The activity models 132 may additionally determine one or more instructions for handling a hazardous object based on the hazard and the one or more features. Such instructions may be specific to an identified hazard and take into account the object, environment, and user features. The instructions may, for example, suggest using a lifting belt, gloves, a mask, a hand truck/dolly, non-slip sneakers, etc. Alternatively, the instructions may suggest holding an object in a particular orientation, taking a break periodically, implementing sanitation processes, etc. The activity handling models 132 are described in greater detail with reference to FIG. 2.

In the exemplary embodiments, the activity handling analyzer 134 may be a software and/or hardware program capable of configuring a session and collecting data of a session. In addition, the activity handling analyzer 134 may be further configured for extracting features from the collected data and applying one or more models to the extracted features to determine one or more hazards and/or instructions. Moreover, the activity handling analyzer 134 may be further configured for notifying the user of the determined one or more hazards and/or instructions. The activity handling analyzer 134 is additionally capable of evaluating whether the one or more hazards and/or instructions were accurate and/or heeded by the user, and adjusting the one or more models. The activity handling analyzer 134 is described in greater detail with reference to FIG. 2.

Figure 2:
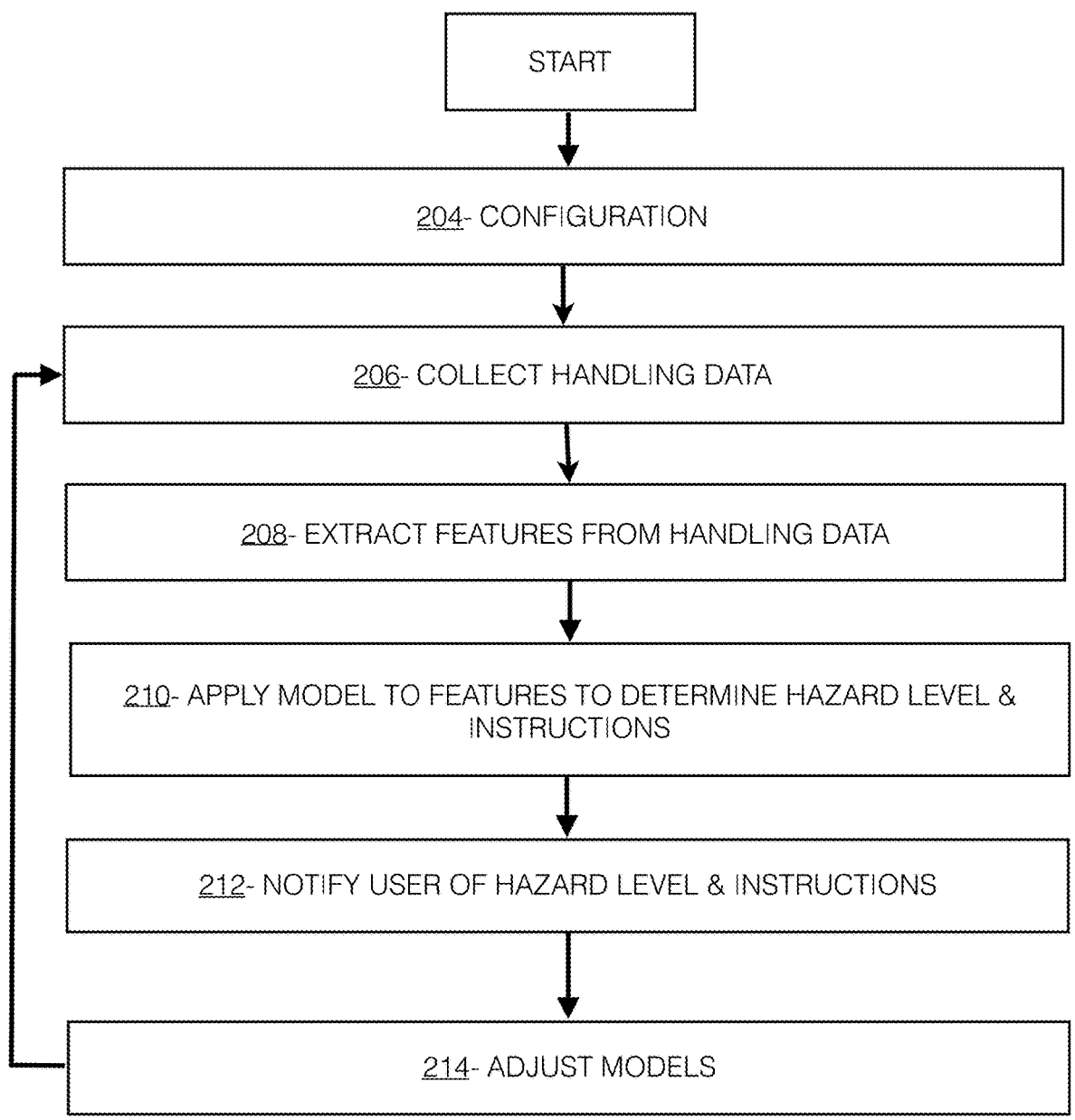
FIG. 2 depicts an exemplary flowchart illustrating the operations of an activity handling analyzer 134 of the activity handling system 100 in mitigating the risks of handling items, in accordance with the exemplary embodiments.

FIG. 2 depicts an exemplary flowchart illustrating the operations of an activity handling analyzer 134 of the activity handling system 100 in mitigating the risks of handling items, in accordance with the exemplary embodiments.

The activity handling analyzer 134 may receive a configuration (step 204). The activity handling analyzer 134 may receive a configuration by receiving a user registration and user preferences. The user registration may be uploaded by a user, i.e., a person wearing the AR device 110 of the activity handling system 100, and the configuration may be received by the activity handling analyzer 134 via the activity handling client 122 and the network 108. Receiving the user registration may involve referencing a user profile via user login credentials, internet protocol (IP) address, media access control (MAC) address, etc., or receiving user input information such as a name, date of birth, gender, address/geographic information, phone number, email address, company name, device serial number, smart device 120 type, a type of the AR device 110, types of the sensors 112, and the like. Receiving a user registration may also involve receiving user health data via user input or reference to an electronic medical/health record that includes data relevant to general user health, medical conditions, medications prescribed to the user, physical fitness, mental fitness, information about past medical office visits, etc. Lastly, the activity handling analyzer 134 may receive a configuration of the one or more sensors 112, whether they be fixed to one or more devices (e.g., the smart device 120 or the AR device 110) or fixed within an environment in which the activity handling system 100 is implemented.

During configuration, the activity handling analyzer 134 may further receive user preferences (step 204 continued). User preferences may include preferences for the manner in which the activity handling analyzer 134 should notify the user of one or more hazards and/or instructions. User preferences may additionally include preferences for the activity handling analyzer 134 to notify the user via audio and/or video feedback. For example, a user may upload user preferences for notification of both a hazard score and instructions via both audio and video feedback.

To further illustrate the operations of the activity handling analyzer 134, reference is now made to an illustrative example where a warehouse employee needs to transport a large, unknown package recently received. The user uploads a user registration including the user's name, type of smart device 120, type of AR device 110, type of sensors 112 including a microphone and video camera located on the AR device 110, and a link to the user's medical records. The user also uploads user preferences specifying that notification of both hazard score and instructions are to be communicated to the user via audio and/or video feedback on the AR device 110.

The activity handling analyzer 134 may collect data (step 206) pertaining to the user's handling of an item. In embodiments, the activity handling analyzer 134 may begin collecting data when receiving a trigger from the user. The trigger may be user input in the form of a selection, such as a button or switch, and may further include an indication of the object or objects the user wishes to handle. Alternatively, the activity handling analyzer 134 may continuously collect data for all objects, environments, and the user. The activity handling analyzer 134 may retrieve data via user upload, databases, or the sensors 112. In embodiments, the activity handling analyzer 134 may collect data via the sensors 112 as one or more microphones built into an auditorium, a camera built into a facility, a spectrometer, etc. The collected data may be related to the object, for example composition, size, weight, center of mass, center of gravity, temperature, fragility, radiation, electrical charge, causticness, adhesiveness, movement history, usage, etc. In addition, collected data may relate to the environment, for example weather, location, surface, grade/slope, etc. The activity handling analyzer 134 may also collect data relating to the user, for example user traits, biometrics, speech, tools (e.g., gloves, hand truck, dolly), etc.

For example, the activity handling analyzer 134 may utilize a video camera, spectrometer, and infrared thermometer to determine a size, composition, and temperature of an object (step 206 continued). In embodiments, the activity handling analyzer 134 may implement gamma rays, x-rays, ultraviolet light, infrared rays, radar waves, microwaves, television waves, radio waves, and other technologies for analyzing the interior of an object. In addition, the activity handling analyzer 134 may utilize a camera to determine that a floor is concrete and reference a weather service or humidity/moisture sensor to determine that the environment is damp. Moreover, the activity handling analyzer 134 may utilize a video camera to collect video data and a pedometer to collect movement data of a user walking in conjunction with reference to a health record in order to determine the user's physical fitness. It will be appreciated that various embodiments of the sensors 112 may be implemented to gather various types of data from an object, environment, and user.

With reference to the previously introduced example where the warehouse employee needs to transport a large, unknown package, the activity handling analyzer 134 collects video data from video cameras, audio data from microphones, composition data from spectrometers, and temperature data from infrared thermometers of the large, unknown, package and the warehouse. In addition, the activity handling analyzer 134 references an electronic health record and pedometer data of the user to assess a physical fitness of the user.

The activity handling analyzer 134 may extract one or more features from the collected and/or received data (step 208). Such features may be extracted from the audio, video, etc. data and/or databases and may include features related to the object, environment, and user. Features related to the object, for example, may include composition, size, weight, center of mass, center of gravity, temperature, fragility, radiation, causticness, adhesiveness, movement history, usage, etc. In addition, features related to the environment, for example, may include weather, location, surface, grade/slope, etc. Moreover, features relate to the user, for example, may include user traits, biometrics, speech, tools (e.g., gloves, hand truck, dolly), etc. While some features require little analysis, for example a temperature feature, other features may require extraction. In order to extract the features, the activity handling analyzer 134 may compare the collected data utilizing techniques such as feature extraction, natural language processing, optical character recognition, pattern/template matching, data comparison, etc. In particular, the activity handling analyzer 134 may extract object features such as object composition based on comparing collected spectrometer data to known item compositions, object size and relative distance based on depth and time of flight analysis, object weight/center of mass/center of gravity based on object size and object composition, written language based on optical character recognition, etc. In addition, the activity handling analyzer 134 may extract environment features such as floor composition based on spectrometer data, grade/slope based on camera/level data, and environmental conditions such as slipperiness based on reference to weather maps, precipitation measurements, temperature data, and camera data showing raindrops and glistening surfaces. The activity handling analyzer 134 may additionally extract user features such as user strength based on age, weight, and gender indicated by an electronic health record, mobility based on pedometer, gyroscope, and GPS data, and exhaustion based on trends in the user data.

With reference to the previously introduced example where the activity handling analyzer 134 collects data pertaining to the package, warehouse, and user, the activity handling analyzer 134 extracts a heavy and cold package, slippery handling environment, and weak user fitness from the collected data.

The activity handling analyzer 134 may apply one or more models to the extracted features to determine one or more hazards and instructions when applicable (step 210). In embodiments, the activity handling analyzer 134 may apply the one or more activity handling models 132 to the extracted features to identify one or more hazards of the handling of an item. As previously mentioned, such extracted features may be related to the object, for example composition, size, weight, center of mass, center of gravity, temperature, fragility, radiation, electrical charge, causticness, adhesiveness, movement history, usage, etc. In addition, the features may relate to the environment, for example weather, location, surface, grade/slope, etc. The features may also relate to the user, for example user traits, biometrics, speech, tools (e.g., gloves, hand truck, dolly), etc. and the one or more activity handling models 132 may be generated through machine learning techniques such as neural networks. Moreover, the activity handling analyzer 134 may weight the extracted features. In embodiments, the one or more activity handling models 132 may be trained at initialization and/or through the use of a feedback loop to weight the features such that features shown to have a greater correlation with hazards are weighted greater than those features that are not. Based on the extracted features and weights associated with such extracted features, the activity handling analyzer 134 may compute one or more feature scores for each extracted feature, and then may compute an overall hazard score based on the cumulative feature scores. The feature scores and overall hazard scores may be represented numerically and/or with high, medium, and low hazard values. In other embodiments, hazard score may be represented in alternative manners.

Based on the extracted features and the determined hazard score, the activity handling analyzer 134 may additionally determine one or more instructions for the user (step 210 continued). As discussed earlier with reference to FIG. 1, instructions may be correlated with features in the activity handling models 132 and may include instructions such as using a lifting belt, gloves, a mask, a hand truck/dolly, non-slip sneakers, etc. Alternatively, the instructions may suggest holding an object in a particular orientation, taking a break periodically, sanitation processes, etc. In embodiments, the activity handling analyzer 134 may provide instructions associated with all features identified while in others, may provide instructions associated with the feature having a greatest feature score. In some embodiments, the activity handling analyzer 134 may provide instructions associated with all features having a feature score above a given threshold. In yet further embodiments, the activity handling analyzer 134 may provide instructions based on a combination of features involved, for example when heavy objects are being moved in slippery environments.

With reference to the previously introduced example where the activity handling analyzer 134 extracts a heavy and cold package, slippery handling environment, and weak user fitness, the activity handling analyzer 134 determines a hazard score of 87 and determines that the following instructions are to be provided to the user: "Heavy item-make sure to lift with your legs, not your back" and "Caution: slippery surfaces."

Upon the activity handling analyzer 134 determining one or more hazards and/or instructions, the activity handling analyzer 134 may notify the user of the determined one or more hazards and/or instructions (step 212). The activity handling analyzer 134 may convey the one or more hazards and/or instructions to the user in the form of audio, video, text, or any other manner via the AR device 110. The activity handling analyzer 134 may illustrate hazards and instructions via overlay within a display of the AR device 110 and the hazards may be identified via text, color, boxing, highlighting, flashing, symbols (hard hat symbol, flammability, electrocution, radiation, hazard), etc. The activity handling analyzer 134 may be configured to color code specific hazards, for example blue colors for cold temperatures and red colors for hot temperatures. In addition, the hazards and instructions may be conveyed audially via one or more integrated speakers. As discussed with reference to configuration, the activity handling analyzer 134 may notify the user of the determined one or more hazard scores and/or instructions according to the user preferences of configuration. In embodiments, the activity handling analyzer 134 may be configured for receiving user input acknowledging, dismissing, and/or affirming the instructions have been followed.

With reference to the previously introduced example where the activity handling analyzer 134 determines a hazard score of 87 and associated instructions, the activity handling analyzer 134 notifies the user of the hazard score 87 and instructions: "Heavy item—make sure to lift with your legs, not your back" and "Caution: slippery surfaces" via audio and video feedback of the AR device 110.

The activity handling analyzer 134 may evaluate and modify the activity handling models 132 (step 214). In the example embodiment, the activity handling analyzer 134 may verify whether the one or more hazards were properly identified in order to provide a feedback loop for modifying the activity handling models 132. In embodiments, the feedback loop may simply provide a means for a user to indicate whether the hazards were correctly identified and/or instructions were practical, easy to follow, etc. The feedback loop indication may be triggered via a toggle switch, button, slider, etc. that may be selected by the user manually by hand using a button/touchscreen/etc., by voice, by eye movement, and the like. Based on the activity handling analyzer 134 properly or improperly identifying a hazard, the activity handling analyzer 134 may modify the activity handling models 132. In other embodiments, the activity handling analyzer 134 may infer or deduce whether the hazards were correctly identified. For example, if an object was identified as a particular weight and it is later weighed, the models may be correspondingly calibrated to reflect an accuracy of the weight estimation. In some embodiments, the activity handling analyzer 134 may interpret user dialogue via natural language processing to determine whether the hazard score or instructions were reasonable. For example, if the user says, "That doesn't make sense" or other expressions indicative of a user's handling action not properly being understood, the activity handling analyzer 134 may infer that the hazard score and/or instructions were incorrectly determined and modify the activity handling models 132 accordingly. Based on feedback received in the above or any other manners, the activity handling analyzer 134 may then modify the activity handling models 132 to more accurately determine hazards and instructions.

With reference to the previously introduced example where the activity handling analyzer 134 notifies the user of the hazard score 87 and associated instructions via the AR device 110, the user says, "Okay, I will do those, thanks" and the activity handling analyzer 134 modifies the activity handling models 132 accordingly.

Figure 3:
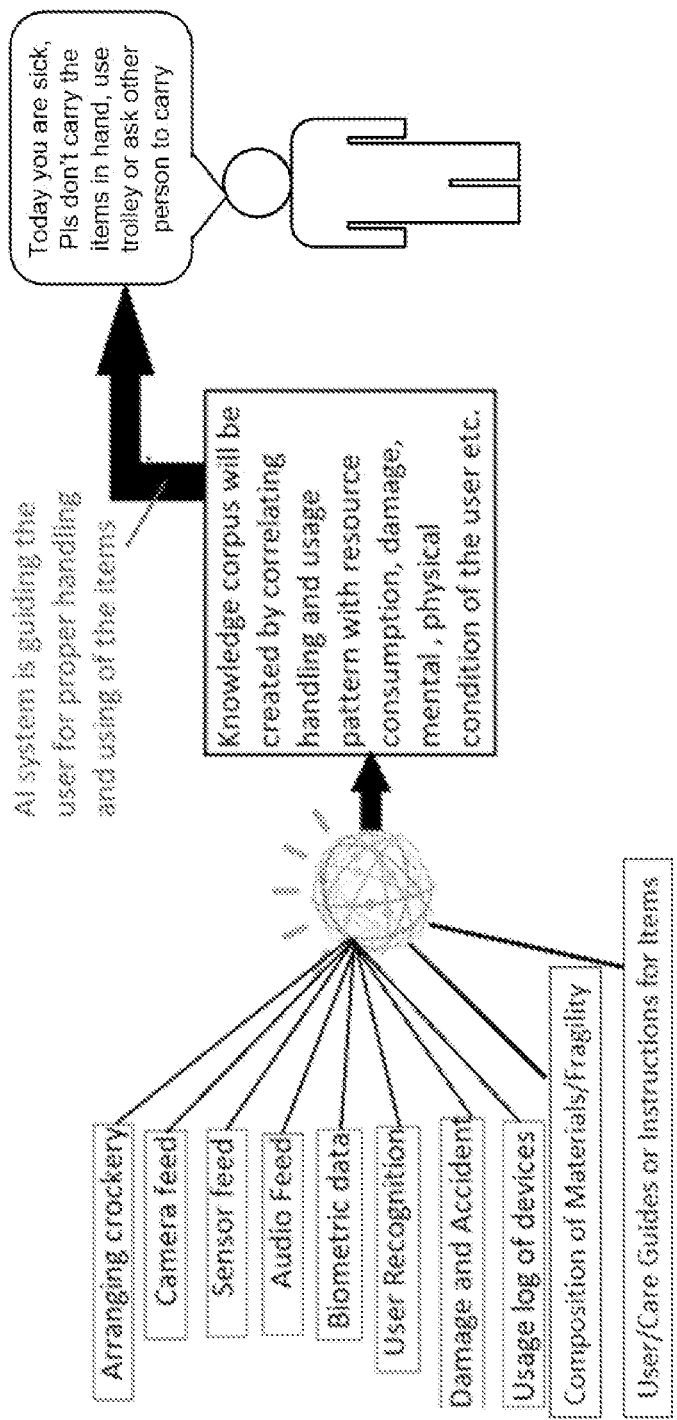
FIG. 3-4 depict exemplary flow graphs of considerations made by the activity handling analyzer 134 in mitigating the risks of handling items, in accordance with the exemplary embodiments.
Figure 4:
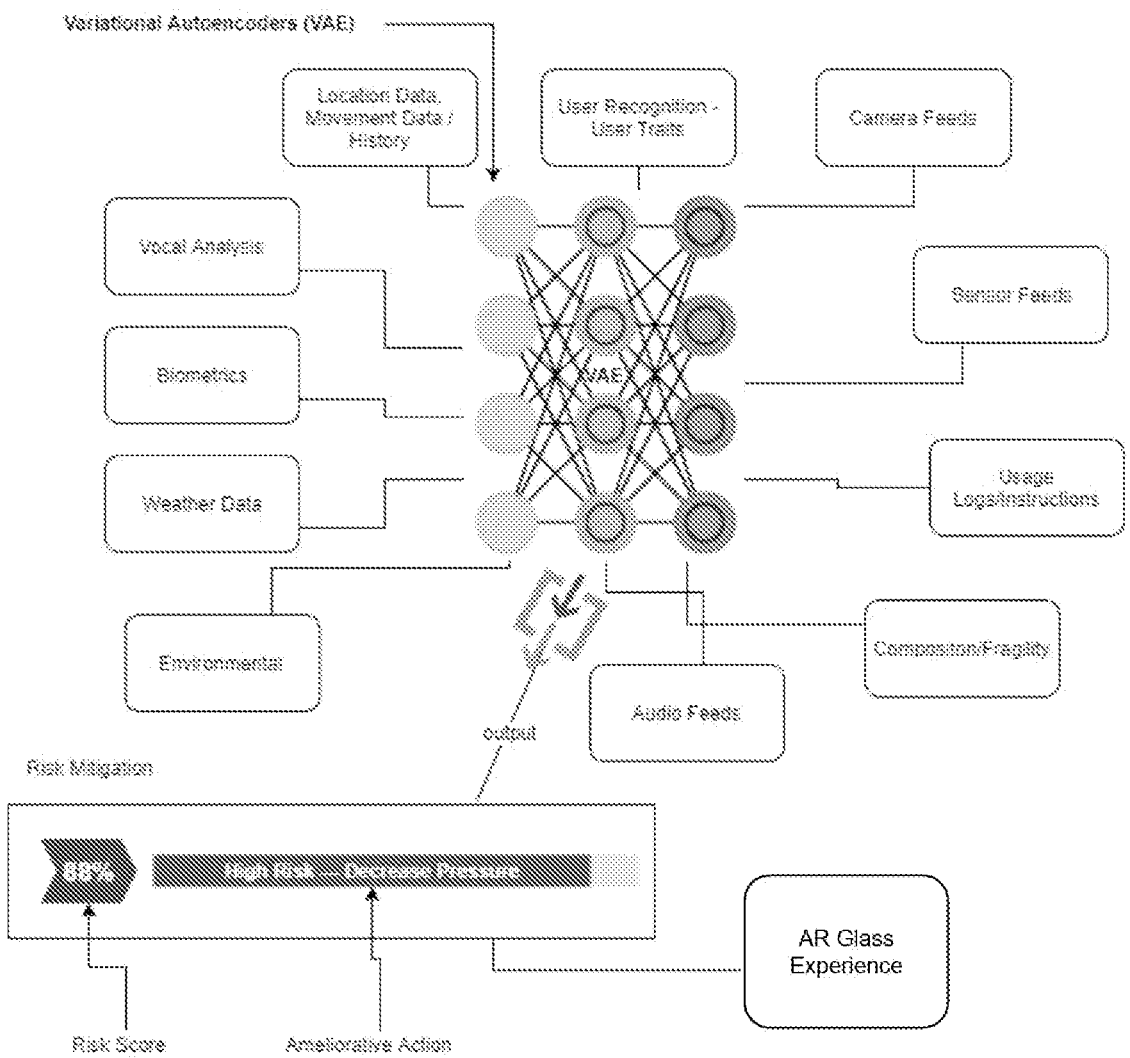

FIG. 3-4 depict exemplary flow graphs of considerations of the activity handling analyzer 134 in mitigating the risks of handling items, in accordance with the exemplary embodiments. FIG. 4 additionally depicts an example of the activity handling analyzer 134 notifying the user of a hazard score and an instruction associated with the user's handling of an item via AR device 110.

Figure 5:
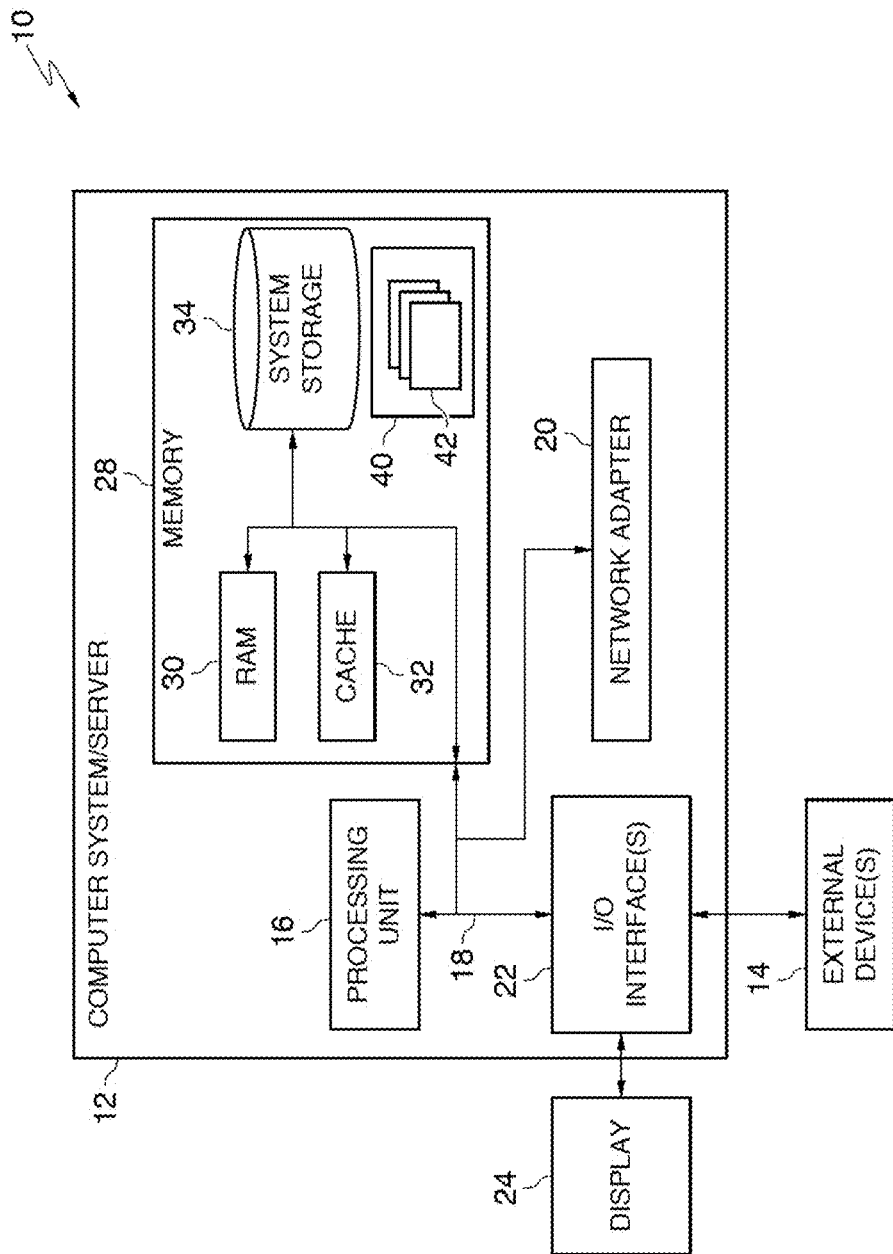
FIG. 5 depicts an exemplary block diagram depicting the hardware components of the activity handling system 100 of FIG. 1, in accordance with the exemplary embodiments.

FIG. 5 depicts a block diagram of devices within the activity handling system 100 of FIG. 1, in accordance with the exemplary embodiments. It should be appreciated that FIG. 5 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
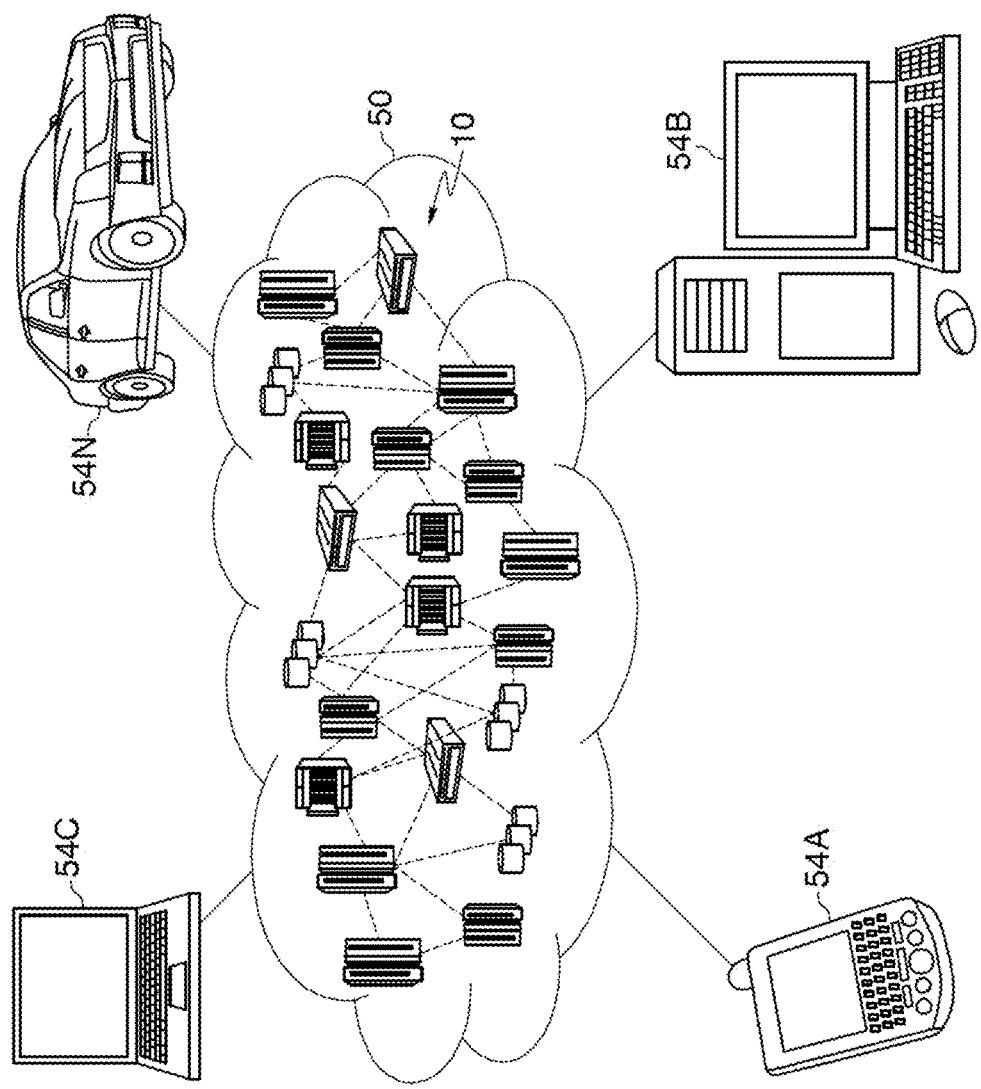
FIG. 6 depicts a cloud computing environment, in accordance with the exemplary embodiments.

Referring now to FIG. 6, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 40 and cloud computing environment 50 can communicate with any type of computerized device over any type of network and/or network addressable connection (e.g., using a web browser).

Figure 7:
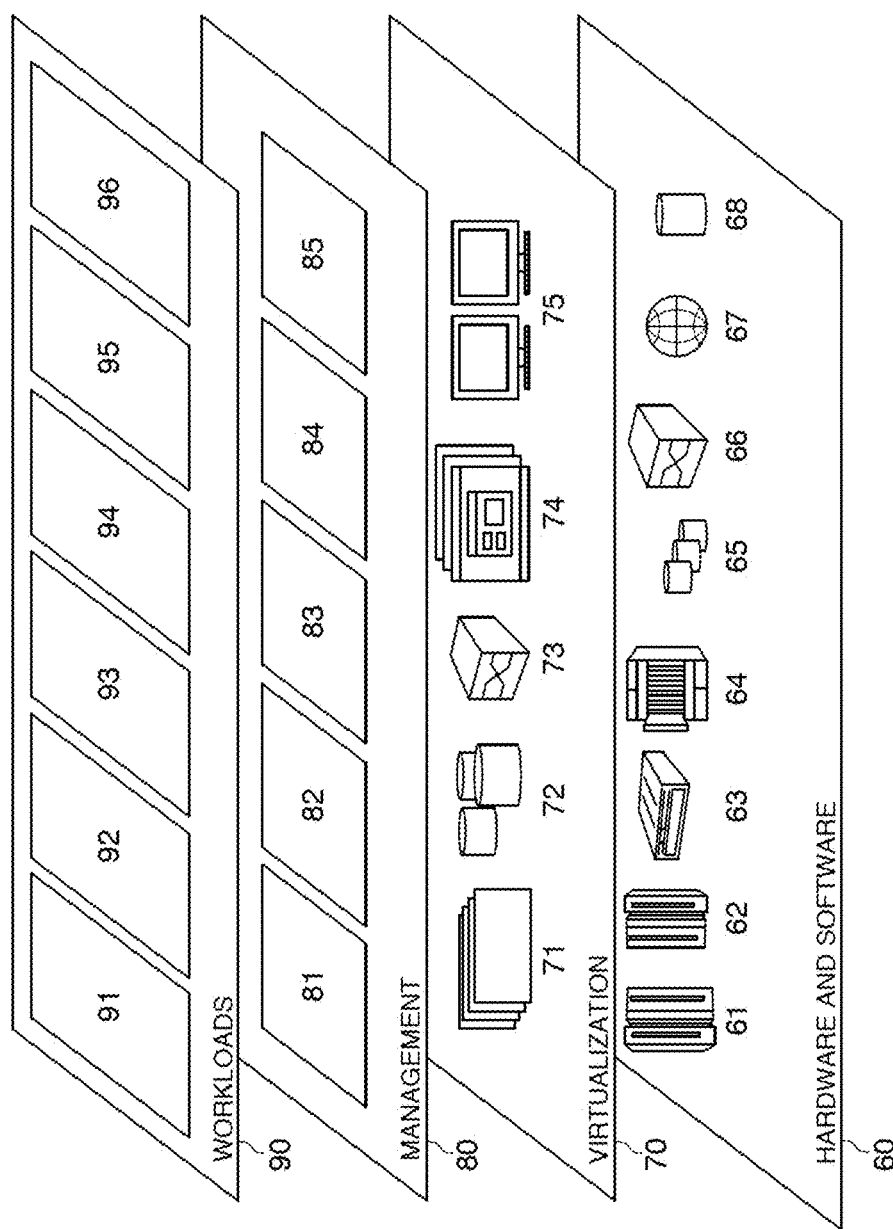
FIG. 7 depicts abstraction model layers, in accordance with the exemplary embodiments.

Referring now to FIG. 7, a set of functional abstraction layers provided by cloud computing environment 50 (FIG. 6) is shown. It should be understood in advance that the components, layers, and functions shown in FIG. 7 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hazard processing 96.

The exemplary embodiments may be a system, a method, and/or a computer program product at any possible technical detail level of integration. The computer program product may include a computer readable storage medium (or media) having computer readable program instructions thereon for causing a processor to carry out aspects of the exemplary embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the exemplary embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the exemplary embodiments.

Aspects of the exemplary embodiments are described herein with reference to flowchart illustrations and/or block diagrams of methods, apparatus (systems), and computer program products according to the exemplary embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various exemplary embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for mitigating risks associated with handling items, the method comprising:
   collecting data relating to one or more items;
   extracting one or more features from the collected data;
      determining one or more hazards based on the extracted one or more features and one or more models;
      displaying the one or more hazards within an augmented reality device worn by a user;
   receiving feedback indicative of whether the determined one or more hazards were accurate; and
   adjusting the one or more models based on the received feedback.

2. The method of claim 1, further comprising:
   determining one or more instructions for handling the one or more items based on the one or more extracted features and the one or more models; and
   displaying the one or more instructions to the user within the augmented reality device.

3. The method of claim 2, further comprising:
   receiving feedback indicative of whether the one or more instructions were heeded by the user; and
   adjusting the one or more instructions and the one or more models based on the received feedback.

4. The method of claim 1, wherein the collected data further includes data relating to the user and an environment.

5. The method of claim 1, wherein the one or more models correlate the one or more features with the one or more hazards of handling items.

6. The method of claim 1, wherein the one or more features include composition, size, weight, center of mass, center of gravity, temperature, fragility, radiation, electrical charge, causticness, adhesiveness, movement history, usage, weather, location, surface, grade/slope, user traits, biometrics, speech, tools.

7. A computer program product for mitigating risks associated with handling items, the computer program product comprising:
   one or more non-transitory computer-readable storage media and program instructions stored on the one or more non-transitory computer-readable storage media capable of performing a method, the method comprising:
   collecting data relating to one or more items;
   extracting one or more features from the collected data;
      determining one or more hazards based on the extracted one or more features and one or more models;
      displaying the one or more hazards within an augmented reality device worn by a user;
   receiving feedback indicative of whether the determined one or more hazards were accurate; and
   adjusting the one or more models based on the received feedback.

8. The computer program product of claim 7, further comprising:
   determining one or more instructions for handling the one or more items based on the one or more extracted features and the one or more models; and
   displaying the one or more instructions to the user within the augmented reality device.

9. The computer program product of claim 8, further comprising:
   receiving feedback indicative of whether the one or more instructions were heeded by the user; and
   adjusting the one or more instructions and the one or more models based on the received feedback.

10. The computer program product of claim 7, wherein the collected data further includes data relating to the user and an environment.

11. The computer program product of claim 7, wherein the one or more models correlate the one or more features with the one or more hazards of handling items.

12. The computer program product of claim 7, wherein the one or more features include composition, size, weight, center of mass, center of gravity, temperature, fragility, radiation, electrical charge, causticness, adhesiveness, movement history, usage, weather, location, surface, grade/slope, user traits, biometrics, speech, tools.

13. A computer system for mitigating risks associated with handling items, the computer system comprising:

one or more computer processors, one or more computer-readable storage media, and program instructions stored on the one or more of the computer-readable storage media for execution by at least one of the one or more processors capable of performing a method, the method comprising:

collecting data relating to one or more items;

extracting one or more features from the collected data;

determining one or more hazards based on the extracted one or more features and one or more models;

displaying the one or more hazards within an augmented reality device worn by a user;

receiving feedback indicative of whether the determined one or more hazards were accurate; and adjusting the one or more models based on the received feedback.

14. The computer system of claim 13, further comprising:

determining one or more instructions for handling the one or more items based on the one or more extracted features and the one or more models; and displaying the one or more instructions to the user within the augmented reality device.

15. The computer system of claim 14, further comprising:

receiving feedback indicative of whether the one or more instructions were heeded by the user; and adjusting the one or more instructions and the one or more models based on the received feedback.

16. The computer system of claim 13, wherein the collected data further includes data relating to the user and an environment.

17. The computer system of claim 13, wherein the one or more models correlate the one or more features with the one or more hazards of handling items.

* * * * *